United States Patent
Mayer et al.

(10) Patent No.: US 6,923,717 B2
(45) Date of Patent: Aug. 2, 2005

(54) ADRENALINE FEATURE FOR SPORTS VIDEO GAMES

(75) Inventors: Umrao Mayer, Moorpark, CA (US); Bob Baker, Thousand Oaks, CA (US); John Brandwood, Ventura, CA (US); Mike Knauer, Newbury Park, CA (US); Colin Palmer, Seattle, WA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

(21) Appl. No.: 09/960,702

(22) Filed: Sep. 24, 2001

(65) Prior Publication Data

US 2003/0032467 A1 Feb. 13, 2003

Related U.S. Application Data

(60) Provisional application No. 60/290,643, filed on May 15, 2001.

(51) Int. Cl.[7] ............................................. A63F 13/00
(52) U.S. Cl. ............................. 463/4; 463/3; 463/23; 463/36; 463/43
(58) Field of Search ................. 463/1–8, 23, 36–39, 463/43

(56) References Cited

U.S. PATENT DOCUMENTS

| | | | | |
|---|---|---|---|---|
| 4,302,011 A | * | 11/1981 | Pepper, Jr. .................... | 463/37 |
| 5,229,756 A | | 7/1993 | Kosugi et al. | |
| 5,790,102 A | * | 8/1998 | Nassimi ........................ | 345/163 |
| 5,885,156 A | | 3/1999 | Toyohara et al. | |
| 6,102,802 A | * | 8/2000 | Armstrong .................... | 463/37 |
| 6,190,314 B1 | * | 2/2001 | Ark et al. ..................... | 600/300 |
| 6,224,482 B1 | | 5/2001 | Bennett | |
| 6,342,008 B1 | * | 1/2002 | Toyohara et al. ............. | 463/23 |
| 6,343,991 B1 | * | 2/2002 | Armstrong .................... | 463/37 |
| 6,424,336 B1 | * | 7/2002 | Armstrong .................... | 345/159 |
| 6,428,414 B1 | * | 8/2002 | Shimomura et al. .......... | 463/31 |
| 6,509,848 B1 | * | 1/2003 | Ogata et al. .................. | 341/34 |
| 6,585,599 B1 | * | 7/2003 | Horigami et al. ............. | 463/43 |
| 2002/0016195 A1 | * | 2/2002 | Namba et al. ................ | 463/3 |

OTHER PUBLICATIONS

Plumb, Matt: NHL 2001, Nov. 1, 2000, Adrenaline Vault, http://www.avault.com/reviews/review_temp.asp?game=nhl2001.*

IGN.com, NHL 2001, Sep. 27, 2000, http://psx.ign.com/objects/014/014658.html.*

IGN.com, NBA Live 2001, Oct. 18, 2000, http://psx.ign.com/objects/014/014654.html.*

Dr. Sprague, Psychological Momentum in Basketball, circa 2000, http://www.spraguesportspsych.com/Psychological%20Momentum%20in%20Basketball.html.*

EA Sports, Tiger Woods 99 PGA Tour Golf, Nov. 25, 1998.*

* cited by examiner

*Primary Examiner*—Michael O'Neill
(74) *Attorney, Agent, or Firm*—Nixon & Vanderhye P.C.

(57) ABSTRACT

A method for controlling game play for use in a video game, wherein a plurality of possible animated actions can be taken by a game character in response to an input from a user provided through a game controller. The method includes: detecting user input from the game controller requesting an animated action by the player; reading an adrenaline value from a control element on the controller indicating a level of aggression desired by the user for the animated action; selecting an animated action from the plurality of possible animated actions based at least in part on the adrenaline value; and performing the selected animated action.

8 Claims, 12 Drawing Sheets

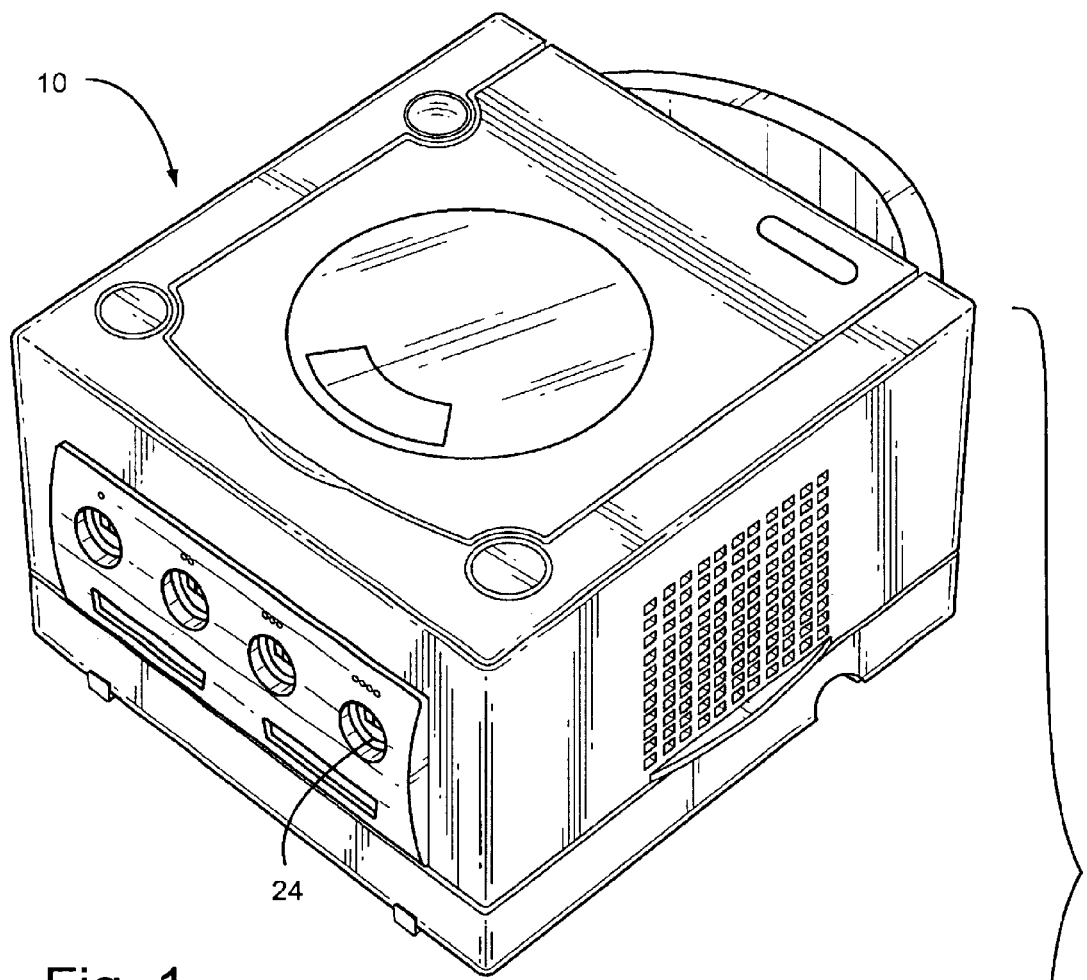
Fig. 1
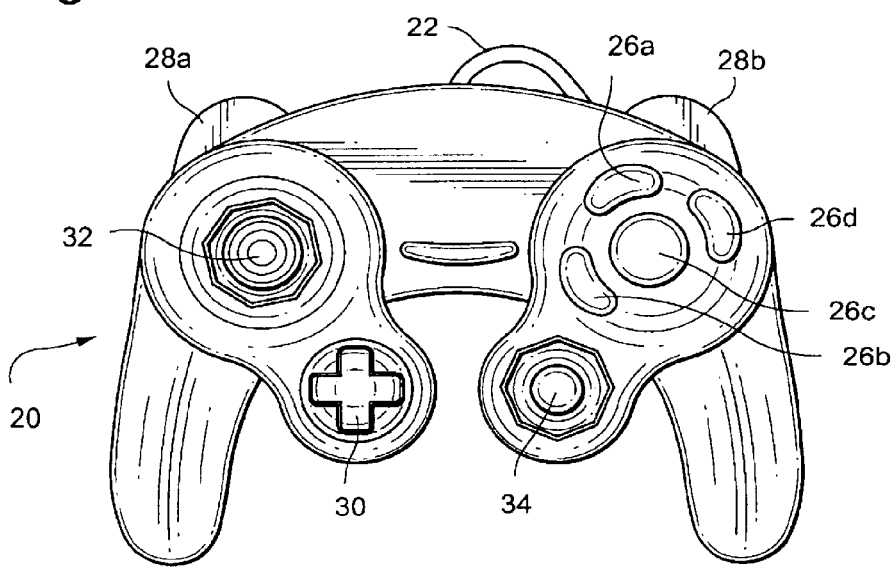

ADRENALINE FEATURE FOR SPORTS VIDEO GAMES

This application claims the benefit of Provisional Application No. 60/290,643, filed May 15, 2001, the entire content of which is hereby incorporated by reference in this application.

FIELD OF THE INVENTION

The instant invention relates to the field of video games and, more particularly, to an adrenaline feature for sports video games and the like. The invention provides an adrenaline feature for sports video games and the like which can be used by the user to cause a player to act with more or less adrenaline or aggression during game play. In accordance with an important aspect of the instant invention, the adrenaline feature can be used to determine the type of action that the player takes in certain situations. For example, in basketball games, the adrenaline feature can be used to select the particular type of dunk, block, dribble, steal and/or shot that a player does at a particular time in the game. The adrenaline feature is preferably implemented using an analog button on a game controller. If the button is not pressed at all during an action of the player (such as a dunk), then the player will perform the action with little adrenaline or aggression, i.e., the player will act conservatively (make a simple dunk) with respect to the situation that the player is currently involved. In contrast, if the adrenaline button is pressed all the way down (indicating maximum adrenaline) the player will act very aggressively during the current action in which the player is engaged (e.g., the player may do a 360 degree slam or tomahawk dunk).

In accordance with the preferred embodiment of the invention, use of the adrenaline button also has a penalty, in that the probability increases for an undesirable event (such as a block, an offensive foul or a miss when dunking) as the adrenaline is increased. Thus, the invention is designed to cause a user to use the adrenaline button with discretion and prudently in order to improve (and not detract from) his performance in the game. Pressing the analog adrenaline button partially will cause the player to act with adrenaline that is proportional to the amount that the button is pressed. In this way a wide range of adrenaline can be selected (e.g., 256 levels of adrenaline for a typical analog button), depending on the desire of the user at any point in the game. The adrenaline button is preferably implemented in a game such that it can control the aggressiveness for a variety of actions that a player takes in a sports game. In basketball, for example, the adrenaline button can be used to control how aggressively (i.e. with how much adrenaline) the player shoots, dunks, blocks, dribbles and steals on a play-by-play basis.

Preferably, the video games on which the invention is implemented also include a momentum feature that increases as the performance of a team increases, and is used to give a team momentum or a temporary advantage over another team. In accordance with the invention, the adrenaline button can be used to increase the momentum of the team when used successfully, thereby giving the user a incentive to use the adrenaline button. Thus, successful use of the adrenaline button can cause the team to be "on-fire" or to have a momentum swing in their direction, which increases the likelihood that future actions for that team will be successful. For example, in basketball, the shooting percentage may increase temporarily when the team's momentum is high. Thus, the adrenaline button can be used to increase the momentum for a team, as well as to make an exciting and aggressive play at a particular time during a game.

The instant invention can be implemented in any suitable sports video game, such as, but not limited to, basketball, baseball, soccer, hockey and football. The invention places much more control in the hands of the user as compared to prior art video games, thereby increasing the enjoyment and realism of sports video games.

BACKGROUND AND SUMMARY OF THE INVENTION

Sports videogames have been very successful and popular in the past. There are a variety of sports games that have been provided for use on videogame consoles, such as NINTENDO's N64, SEGA's DREAMCAST, and SONY's PLAYSTATION2, to name just a few. Numerous basketball, football, soccer, baseball and hockey games, as well as many other sports games, have been created for playing on videogame consoles. Due mainly to the major advancements in graphics hardware over the years, these sports videogames have become very realistic and provide users of the games with an exciting and enjoyable experience that closely simulates real sports competition. The software behind these videogames has also become very sophisticated and facilitates many elements of real sports competition in order to provide the user with an experience that simulates real sports play as close as possible. For example, in basketball video games, the player is provided with the ability to dribble, pass, shoot, dunk, block and perform many other simulated acts that a real basketball player would perform during an actual game. A few better known basketball videogames include NINTENDO's NBA COURTSIDE I and II, NBA LIVE 2000–2002, MIDWAY's NBA SHOWTIME, ACCLAIM's NBA JAM, as well as college games (NCAA) provided by ELECTRONIC ARTS and others (just to name a few).

While prior videogames have very realistic game play, the industry is constantly striving to improve the games and provide even greater realistic and exciting experiences for the player. Constant improvements are needed in order to continue to satisfy the every increasing demand for high quality and realistic sports video games.

In order to make sports video games more interesting for the users, a variety of different types of actions are made possible for a player to perform during the game and a variety of different animations are used for each different action. For example, basketball games typically include numerous different types of dunks that can be performed depending on the particular situation that a player is in when the user provides a dunk command. For each situation that a player may be in there are often numerous different actions that the player may take in response to a command from the user to take an action. For example, when a user presses the shoot or dunk button during a basketball game, there are typically numerous possible dunks (and corresponding dunk animations) that the player may perform, some being more aggressive and riskier than others. In other words, a number of possible dunks (e.g., 5–25 different dunks) may be authorized and defined by the game software for a situation that a particular player is currently in when a dunk is requested by the user. In conventional games, the particular dunk from the list of possible dunks that is performed is not determined by the user, but instead is determined randomly (or pseudo-randomly) by the software itself. In other words, this aspect of the game, i.e., the selection of the particular action from a list of possible actions, is not under the control of the user. As a result, the player may, for example, perform an aggressive dunk (high adrenaline move) even though the user would have preferred that the player act more conservatively in that particular situation to avoid the possibility that, for example, the dunk would be missed, blocked or result in an offensive foul. In fact, in conventional games it can be frustrating for a user when the player makes an aggressive move and losses the ball, when a more conservative move would have resulted in an easy basket. On the other hand, it can be equally frustrating when the player does not act aggressively in a situation that calls for aggressive action, i.e., in a situation where an aggressive move will likely be successful (e.g., 360 degree slam dunk under the basket with no defenders around) and will increase the team's momentum. The level of aggression or adrenaline that is used can be an important element on both offense and defense. However, with prior art games, this game parameter is not under the control of the user, which significantly detracts from the realism and enjoyment of the game. The fact that the software determines which particular move or action is performed by the player out of a list of possible moves detracts from the overall competition and enjoyment of the game.

One prior art technique that has been used in an attempt to give the user more control over the type of action that is taken by a player during game play, is to assign certain actions to certain buttons on the controller. For example, in a basketball game, the user and/or the software may assign certain types of dunks to certain buttons, respectively, on the game controller. One button could be assigned a simple, low aggression dunk and another could be assigned a 360 degree slam dunk. Thus, the user can select the type of dunk that is performed by selecting the desired button on the controller. While this prior technique does provide increased control for the user in determining the type of action taken by a player during game play, it also has the disadvantage of complicating the game by requiring the user to assign various buttons to the various actions and to remember what button represents what action. In addition, there are a limited number of buttons available on game controllers (e.g., 4) for such purposes. Thus, this technique does not work for games that have many different (e.g., 10 or more) possible types of actions for a particular situation.

Sports games are including more and more possible player actions in the games which has increased the problem of no control by the user over the particular action taken by the player. For a particular player located in a particular position on the court there may be twenty or more possible actions that could be taken, each having its own level of aggression and associated animation. Not being able to control the particular level of aggression that is used prevents the game from being as realistic as it otherwise could be. Certainly, real world players select the particular aggression level that they will use for a particular action depending on the particular circumstance that they are in at the time. Sometimes aggressive or high adrenaline moves are needed or called for based on the current situation, while other times lower aggression moves are needed so as not to take a chance for an adverse result. The amount of aggression or adrenaline that a player uses applies to many different types of actions in sports games, on offense as well as defense. Some of the more common actions having particular application to the present invention are, for example, shooting, blocking, dribbling, hitting, dunking and stealing.

A variety of game controllers have been provided in the past for use by the user to manipulate the action during game play. Such controllers generally have several digital buttons and an analog joystick for use by the user during the game. More recently, game controllers, such as the controller for SONY's PLAYSTATION2 and for the NINTENDO GAMECUBE, have incorporated a second analog joystick and/or one or more analog buttons.

For at least the foregoing reasons, improvements in user control over the particular type of action that a player may take in a sports video game or the like are needed. The present invention addressed this need by providing an adrenaline button on the game controller that enables the user to specify the particular level of adrenaline or aggression that will be used for a particular action at a particular point in time. Thus, the user can decide how aggressive the player will act in certain situations, thereby enabling the player to balance the advantages of acting aggressively (e.g., increasing momentum and/or seeing exciting animations) against the disadvantages of acting aggressively (e.g., having the shot blocked or ball stolen).

In accordance with a main aspect of the invention, a method for controlling game play is provided for use in a video game, wherein a plurality of possible animated actions can be taken by a game character in response to an input from a user provided through a game controller. The method of controlling game play, includes: detecting user input from the game controller requesting an animated action by the player; reading an adrenaline value from a control element on the controller indicating a level of aggression desired by the user for the animated action; selecting an animated action from the plurality of possible animated actions based at least in part on the adrenaline value; and performing the selected animated action.

In accordance with another aspect of the invention, the method further includes using an analog button on the controller as the control element for indicating the level of aggression desired by the player for the animated action.

In accordance with another aspect of the invention, a method is provided for controlling game play in a video game, wherein a user interactively controls a game character in a virtual environment using a game controller. The method includes: defining initial character parameters for the character for use during game play; detecting user input from the game controller requesting an animated action by the character; reading an adrenaline value from a control element on the controller indicating a level of aggression desired by the user for the animated action; adjusting at least one of the initial character parameters based on the adrenaline value; and performing the animated action using the adjusted character parameters.

BRIEF DESCRIPTION OF THE DRAWINGS

These and other features, objects and advantages of the instant invention will be better understood from review of the following detailed description of the invention when read in conjunction with the following drawings, in which:

FIG. 1 shows an exemplary game console for use in playing videogames and a game controller for enabling a user to control operation of the game;

DETAILED DESCRIPTION OF THE PREFERRED EMBODIMENTS

Figure 2:
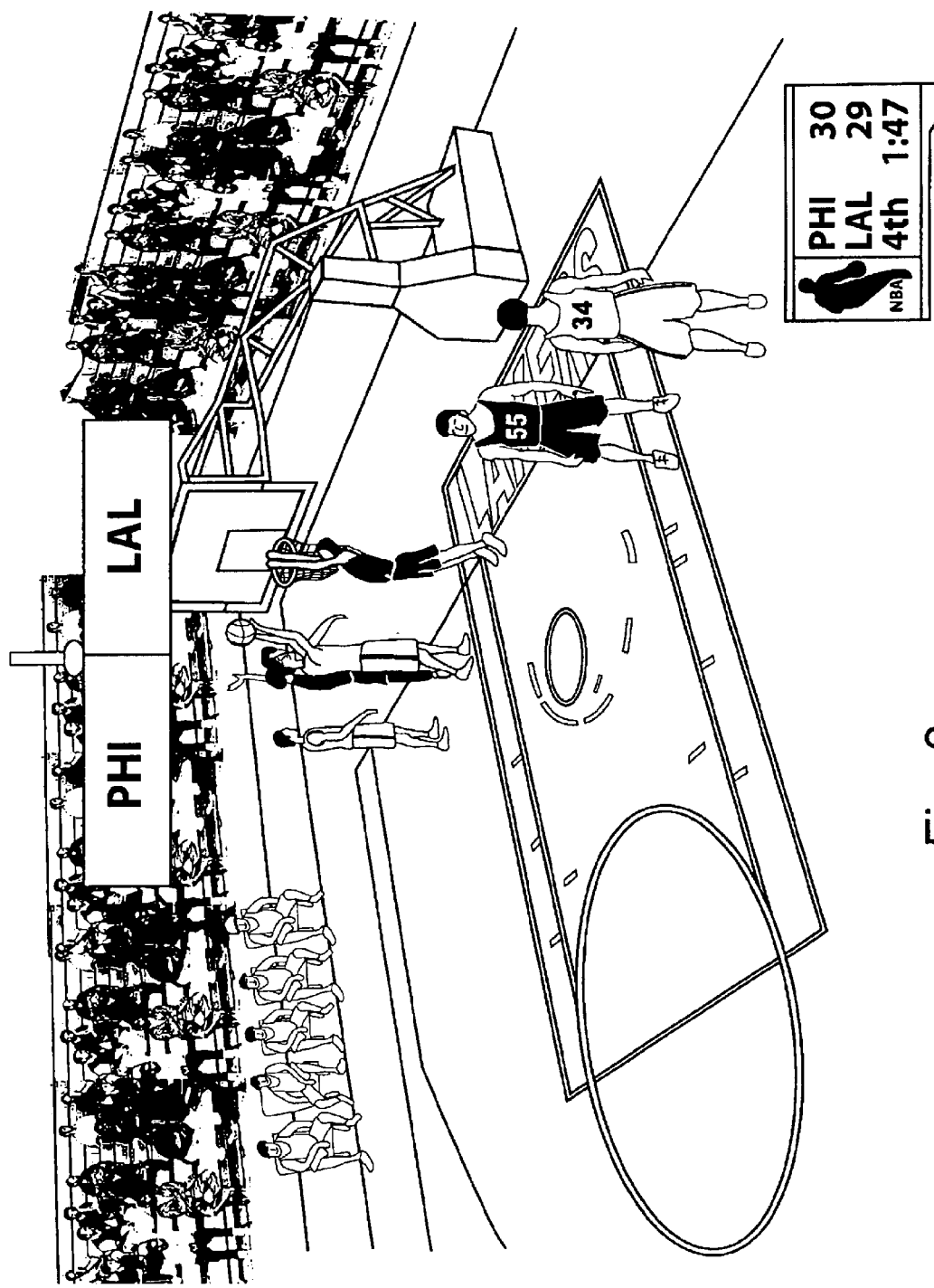
FIG. 2 is a screen shot of a basketball videogame incorporating the adrenaline feature of the instant invention. In this figure, a player is shown performing a low adrenaline block.

The preferred embodiments of the instant invention will now be described with reference to the drawings. FIG. 1 shows a videogame console 10 that can be used to run videogames implementing the adrenaline control feature of the instant invention. While the NINTENDO GAMECUBE video game console is shown in FIG. 1, the invention can be implemented on any suitable game platform capable of running sports games, including PC based games incorporating a game controller. In the videogame console 10 of FIG. 1, a memory medium, such as a CD or DVD, is used to store videogame software. The software containing disk or other storage medium is placed in the console for controlling the operation thereof and enabling a desired game to be played on the console. The console preferably includes a graphics co-processor in addition to the central processing unit (CPU) in order to enable fast action games to be played and displayed in a very realistic and exciting manner. The console is typically connected to a display device, such as a television.

The game console is also provided with a game controller 20 for use by the user in controlling the game by providing input to the console 10 through selective operation of the buttons and other control elements on the controller 20. The controller 20 is preferably connected by wire 22 to the console via the connection port 24, although a wireless connection or any other operable connection may be used. The controller 20 includes several different buttons that provide various corresponding signals to the game console for use by the game software to control the game in accordance therewith. More particularly, the exemplary controller 20 of FIG. 1 includes a cluster of four digital buttons 26a–26d, two analog buttons 28a and 28b, a joypad 30, a first analog joystick 32 and a second analog joystick 34, as well as other control elements, such as a start/stop button. One of the two analog buttons 28a and 28b are preferably used to implement the adrenaline feature of the instant invention, as will be explained in detail below.

The instant invention has particular applicability to sports videogames in which a several (or at least two) different actions can be taken in a given situation each having a defined level of adrenaline or aggression. Such games include but are not limited to basketball, baseball, soccer, football and hockey. In accordance with the instant invention, the game software is programmed to respond to signals from the controller 20, such that operation of the analog button (e.g., button 28a) dictates the amount of aggression that the player's action will have on a play-by-play basis. The remaining buttons preferably operate in a conventional manner to control game play as one skilled in the art will readily understand.

In accordance with the invention, all of the possible actions that a player can take are assigned an aggression or adrenaline level. When the player is ready to take an action, the system looks at the adrenaline button 28a to determine how aggressive the user wants to be at that time (from no adrenaline to maximum adrenaline, as well as various levels therebetween). Based on the adrenaline level indicated by the user, a particular action is selected from all of the available actions for the player in that particular situation. Thus, only actions corresponding to the aggression level indicated by the user through operation of the analog button are selected by the system for possible use by the player. If more than one action is available at the indicated aggression level, the software may randomly or otherwise select the particular action from the list of possible actions having the indicated aggression level. In this way, the player can select an action for the player that corresponds to a desired adrenaline or aggression level. As a result, the player can strategically and prudently use the aggression button to balance the advantages of performing very aggressive actions or moves against the potential disadvantages of acting aggressively in the game. As a result, use of the adrenaline button becomes a strategic part of the game and adds a further level of excitement and realism to game play.

The game is preferably programmed so that the more aggressive moves correspond to more exciting animations and, if successful, increase the momentum for the team. In addition, the game preferably provides built-in penalties for using the adrenaline button. For example, use of the adrenaline button when blocking preferably increases the chance of a foul, while also increasing the change of a steal or block. Using the adrenaline button in a baseball game when at bat may, for example, cause a more powerful swing with less accuracy. Using the adrenaline button in a football game may, for example, cause a better block but with an increased chance of causing a penalty flag to be thrown. The adrenaline button may be used for any game where varying degrees of action are defined by the game and a selection between one of the possible actions is made. The adrenaline button is used in the selection of the particular action by the game software.

In accordance with a preferred embodiment of the invention, several different actions are defined for each situation that a player may be in at any given time. For example, in basketball, various dunks may be defined in the game (e.g. 200 different dunks and associated animations) and depending on a variety of parameters, such as how close the player is to the basket, the direction that the player is facing, how fast the player is moving and/or any other suitable parameters, a certain subset of the total possible dunks are determined as being possible for the circumstance that the player is currently in. Unlike conventional games, wherein the software automatically select one of the actions from the list, the instant invention uses output from the adrenaline button to select (or aid in the selection) of the particular action to be performed. Thus, the player can be made to act more or less aggressively depending on the desire of the user by operation of the adrenaline button. More aggressive actions are rewarded with increased momentum and/or exciting animations, while also being more susceptible to negative consequences.

Figure 3:
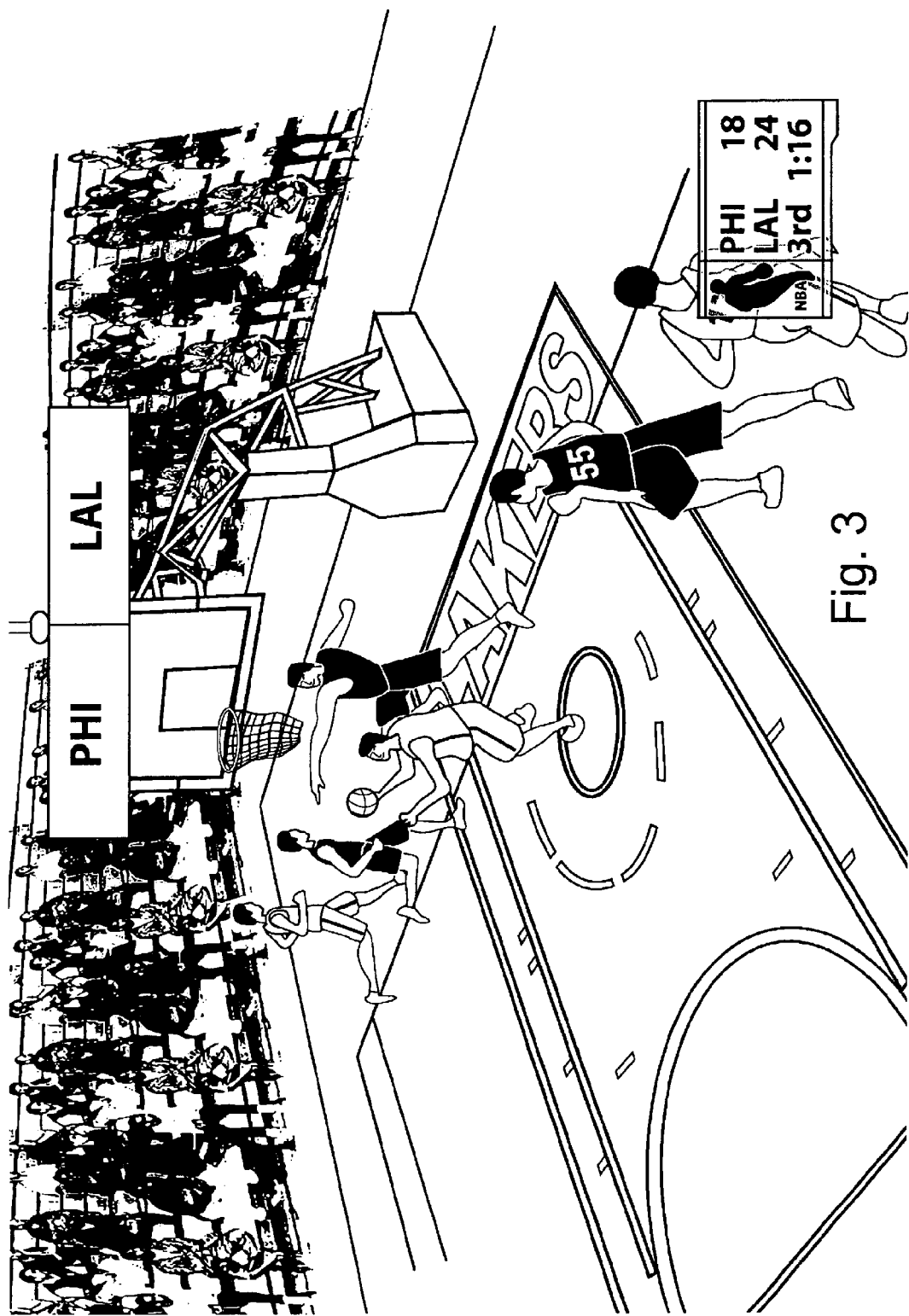
FIG. 3 is a screen shot showing the player of FIG. 2 performing a high adrenaline block.
Figure 4:
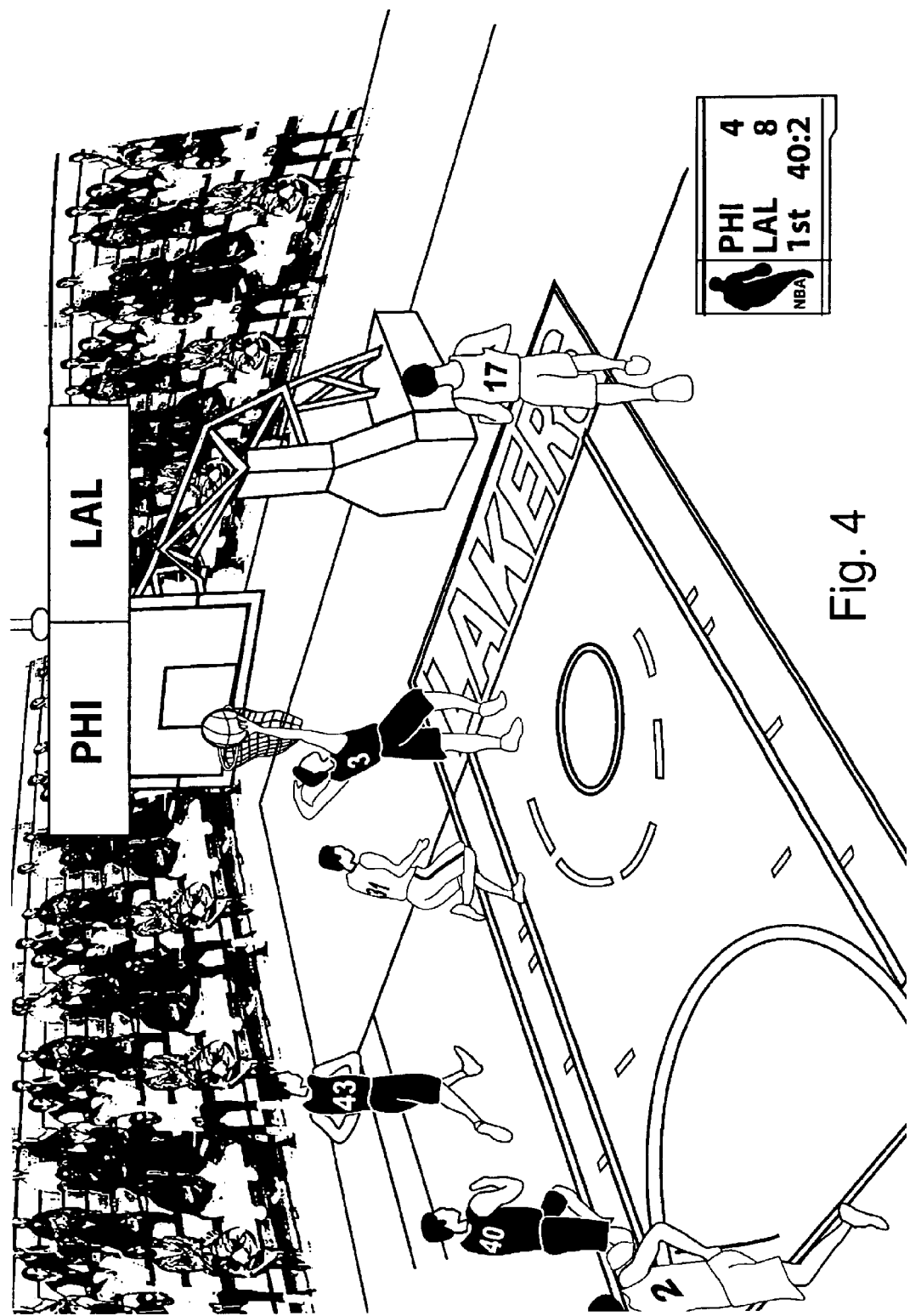
FIG. 4 is a screen shot showing a player performing a low adrenaline dunk.
Figure 5:
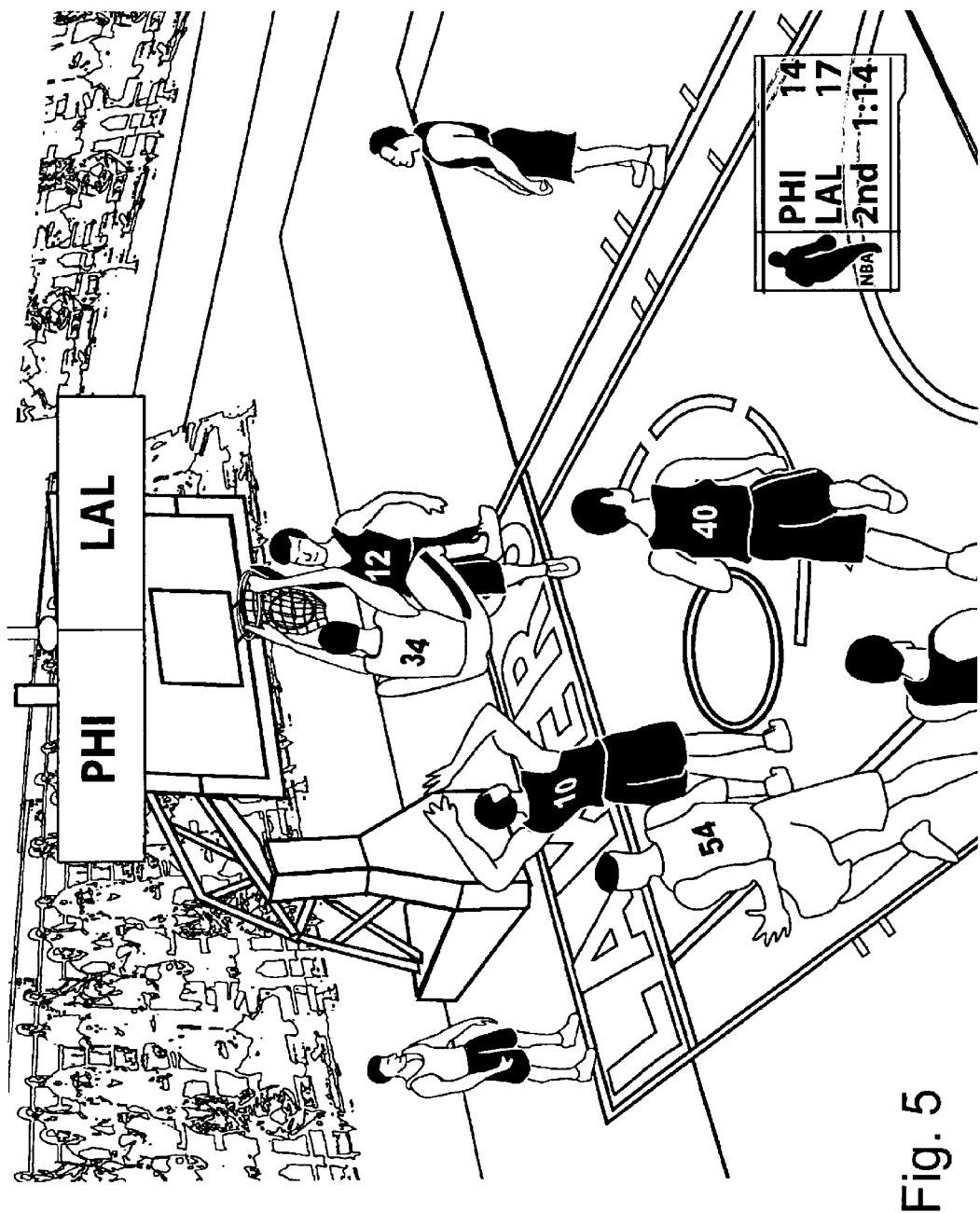
FIG. 5 is a screen shot showing a player performing a high adrenaline dunk.
Figure 6:
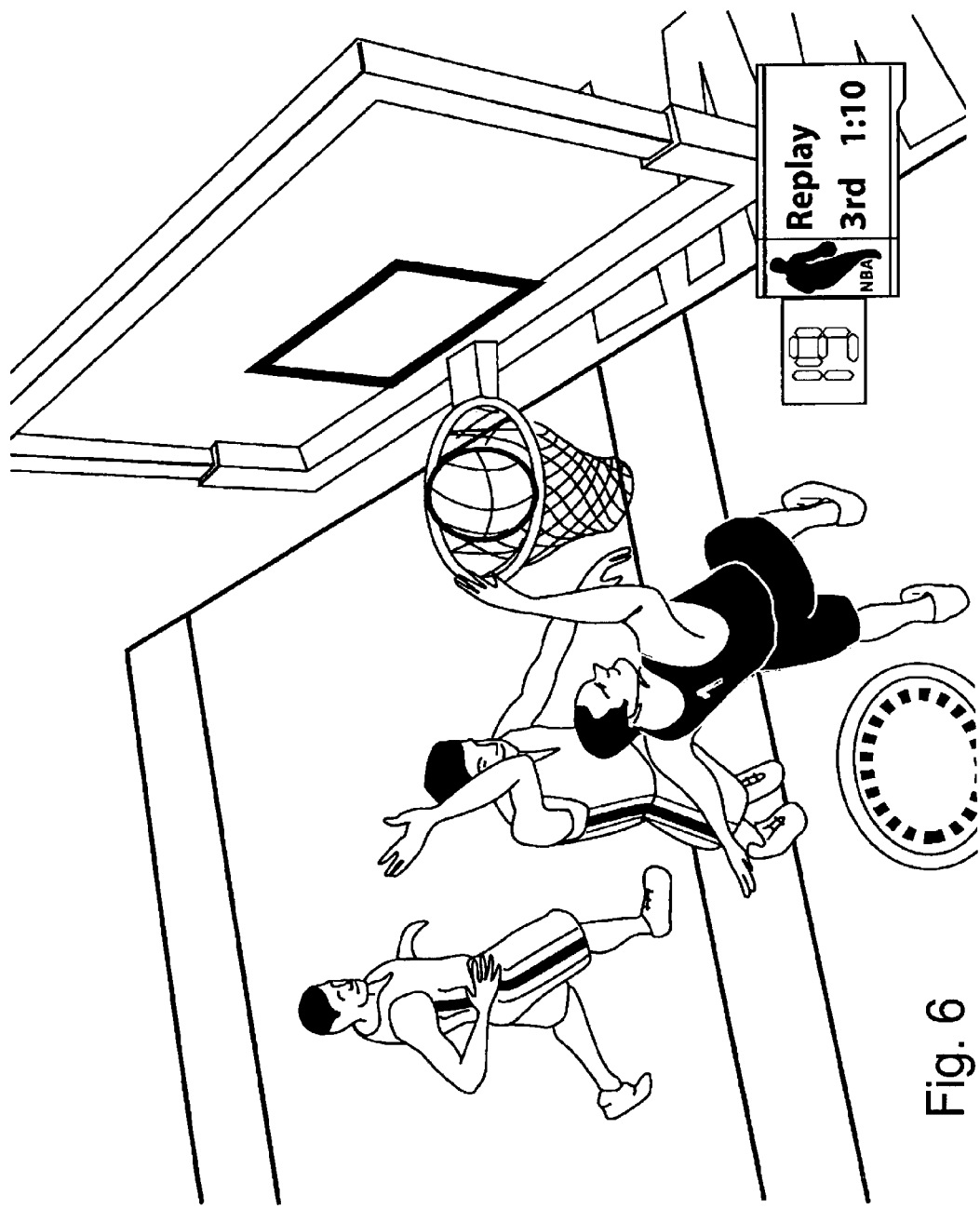
FIG. 6 is a screen shot showing a player performing another low adrenaline dunk.
Figure 7:
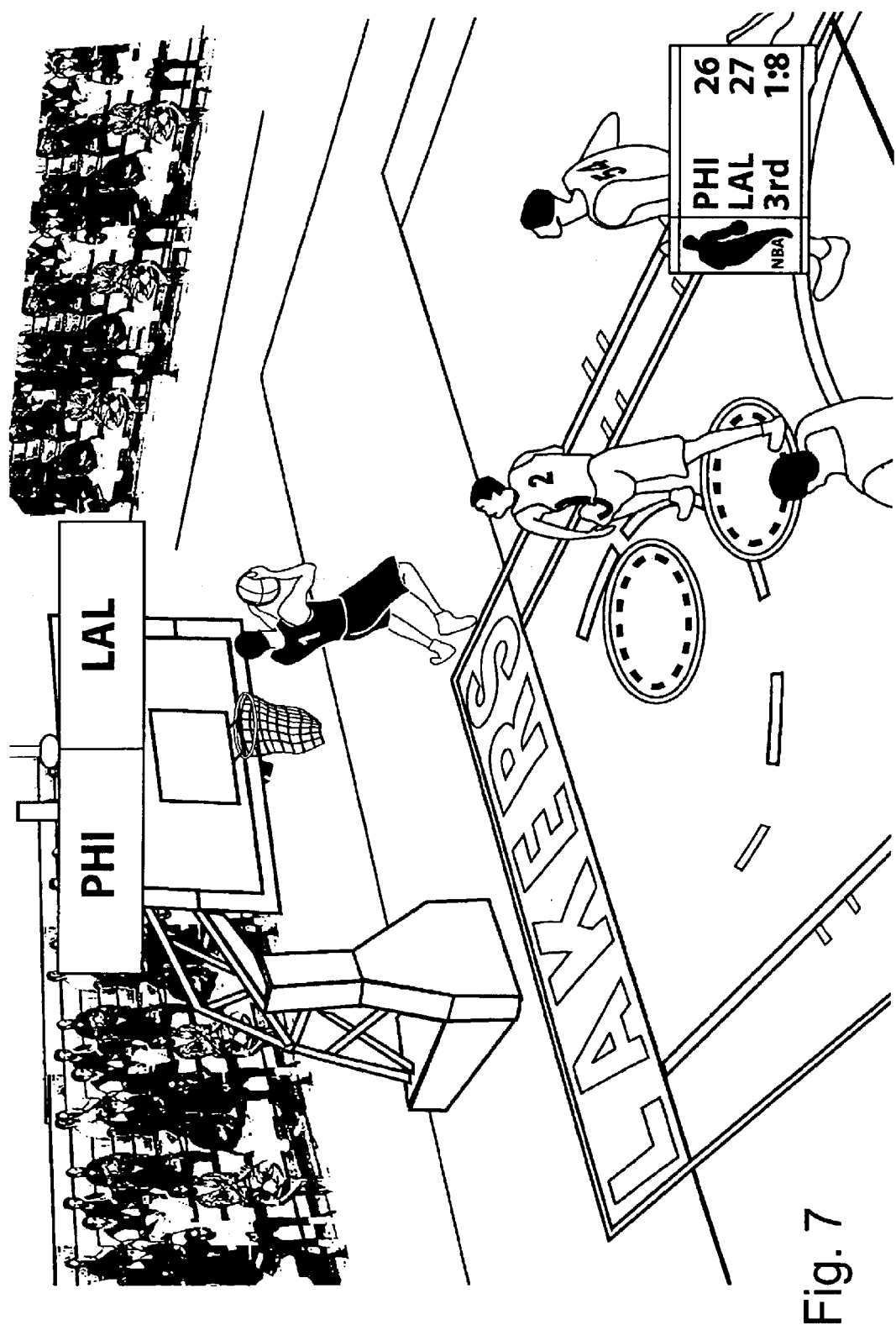
FIG. 7 is a screen shot showing a player performing another high adrenaline dunk.

FIG. 2 shows an exemplary basketball video game that implements the teachings of the instant invention. In FIG. 2, the defensive player is shown performing a low adrenaline attempted block of the shot by the offensive player. In other words, the defensive player used little or no adrenaline button when blocking. In this situation, the defender may not have wanted to take a chance of causing a foul, thereby acting conservatively. FIG. 3 shows the defender making a much more aggressive block attempt, resulting from strong operation of the adrenaline button (i.e. pressing the button down completely or close to completely). With this aggressive block move, there is a higher chance that the defender will block the shot, but also a higher chance for a foul. FIG. 4 shows an offensive player making a simple or low adrenaline dunk, as a result of little or no use of the adrenaline button. In contrast, FIG. 5 shows a high adrenaline dunk being performed as a result of strong use of the adrenaline button. This dunk has a greater chance of being blocked but also results in exciting animation and increased momentum for the team. FIG. 6 shows another low adrenaline dunk being performed as a result of the player deciding not to be aggressive at the time of the dunk (i.e., little or no use of the adrenaline button). In contrast, FIG. 7 shows another high adrenaline dunk which, if successful, will increase the teams momentum and/or provide increased excitement for the user. While only basketball shooting and blocking are shown in the drawings, the instant invention can be implemented for any game action that has varying degrees of aggression or the like and is not limited to any particular application. The adrenaline feature provided by the instant invention greatly improves sports games by giving the user greater control over actions of the players and by adding another strategic level to the games, thereby improving the entire game as compared to prior games.

The invention is not limited to any specific types of sports games and can be implemented in any game where varying levels or degrees of action are possible during the game. The invention is particularly advantageous for use in connection with sports videogames with fast action, such as football, baseball, basketball, hockey, soccer and the like, and with a momentum feature that can swing in a teams favor when exciting and aggressive plays are made.

The instant invention is not difficult to implement in a videogame. To implement the invention, the game software can simply be programmed to look at the analog button 28*a* (adrenaline button) for an adrenaline signal when a decision is made as to what action the player will take at a particular time during the game (instead of using a random selection as in prior games). More exciting animations are preferably associated with higher adrenaline plays, so that the game gives an incentive to the user to use the adrenaline button.

While the preferred embodiment of the instant invention uses an analog button (e.g., buttons 28*a* and/or 28*b*), other embodiments are also possible. For example, a digital button (e.g., 26*a*, 26*b*, 26*c* or 26*d*) could be used to implement the adrenaline feature of the instant invention. The digital button could indicate high or low adrenaline depending on whether or not the digital button is pressed at the time of the play. Of course, this embodiment only allows two levels of aggression or adrenaline. Alternatively, adrenaline button could be implemented such that depending on how long the digital button is pressed determines the particular amount of adrenaline that is used for a particular play, thereby enabling a digital button to be used to indicate numerous different levels of adrenaline (like the analog adrenaline button discussed above). In another alternative embodiment, an analog joystick, such as the secondary analog joystick 34 of FIG. 1, can be used as an adrenaline control element. In particular, the amount of inclination of the stick in any direction from its neutral position could be used to set an adrenaline amount for the play by the user. Thus, the invention can be implemented on game controllers that do not have analog buttons (i.e. by using a digital button or an analog joystick).

As can be seen from the foregoing description, the invention greatly enhances sports games by enabling the user to be involved in the decision as to what level of action will be used for a particular play in the game. The invention does not necessarily enable the player to pick the exact move, but instead enables then player to pick what range of move (from low intensity to high intensity) will be used on a play-by-play basis. The invention enables the user to be much more a part of the game, rather than being a bystander during the selection of the player's action (as in prior games).

Below is an example of how the adrenaline button of the instant invention can be implemented in a basketball embodiment. The example below shows how use of the adrenaline button will affect different aspects of game play. The example includes references to ratings percentages and defaults. These numbers are only exemplary and can vary depending on the particular application or desires of the game developers. The "TBD" reference indicates that the particular boost that will be used can vary from one game to another and can be set as desired by the game developers.

EXAMPLE BASKETBALL IMPLEMENTATION

Dunking

Adrenaline Button Not Held:

Dunk boost (TBD) added to Momentum Meter on successful dunk.

Dunk/lay-up rating drops by 50%.

Chance of being called for charge is left at default if collision occurs.

Chance of defender being called for a block increases by 30% if collision occurs.

Shot block rating of opponent is left at default.

Adrenaline button Held All the way down:

Dunk boost (TBD) *3 added to Momentum Meter on successful dunk.

Dunk/lay-up rating left at default.

Chance of being called for charge increases by 30% if collision occurs.

Chance of defender being called for a block is left at default if collision occurs.

Increases shot block rating of opponent by 30%.

Special Dribbles

Adrenaline Button Not Held:

Special dribble boost (TBD) added to Momentum Meter on successful dribble move.

Chance of being called for charge is left at default if collision occurs.

Chance of defender being called for a block increases by 30% if collision occurs.

Steal rating of opponent is left at default.

Adrenaline Button Held All the way down:

Special dribble boost (TBD) *3 added to Momentum Meter on successful dribble move.

Chance of being called for charge increases by 30% if collision occurs.

Chance of defender being called for a block is left at default if collision occurs.

Increases steal rating of opponent by 30%.
Blocking
  Adrenaline Button Not Held:
    Special block boost (TBD) added to Momentum Meter successful block.
    Chance of being called for foul is left at default.
    Block rating on opponent is left at default.
  Adrenaline Button Held All the way down:
    Special block boost (TBD) *3 added to Momentum Meter successful block.
    Chance of being called for foul increases by 30%.
    Block rating increased by 30%.
Steal
  Adrenaline Button Not Held:
    Steal boost (TBD) added to Momentum Meter on successful steal.
    Steal rating left at default.
    Chance of a foul being called left at default.
  Adrenaline Button Held All the way down:
    Special steal boost (TBD) *3 added to Momentum Meter on successful steal.
    Chance of being called for foul increases by 30% (inversely proportional to steal rating).
    If foul chance percentage exceeds 80%, call technical foul and play push animation.
    Chance of stealing the ball from opponent increases by 30%
Shooting
  Adrenaline Button Not Held:
    Shot boost (TBD) added to Momentum Meter on successful shot.
    Shot rating left at default.
    Chance of defender being called for a foul left at default.
    Shot block rating of opponent is left at default.
  Adrenaline Button Held All the way down:
    Shot Boost (TBD) *3 added to Momentum Meter on successful shot.
    Shot rating increased by 15%.
    Chance of shot being blocked increases by 30%
    Chance of defender being called for a foul decreases by 30%.
Rebounding
  Adrenaline Button Not Held:
    Rebound boost (TBD) *3 added to Momentum Meter on successful rebound.
    Rebound rating is left at default.
    Chance for loose ball foul is at default.
  Adrenaline Button Held All the way down:
    Rebound boost (TBD) *3 added to Momentum Meter on successful rebound.
    Rebound rating increases by 30%.
    Chance of loose ball foul being called increases by 30%.

In the above example, it can been seen that the user will get three times (*3) the dunk boost on the momentum meter when the adrenaline button is pressed all the way as compared to not being pressed at all. The player's dunk/lay-up rating is also decreased by 50% if the adrenaline button is not used. In other words, the player cannot perform to his maximum ability without using the adrenaline button. For example, dunks that require a certain dunk rating for a player may not be possible to perform by the player unless the adrenaline button is used. This rating feature is explained in greater detail below. The chance of being called for a charge also increases when the adrenaline button is used when dunking. The chance of the defender being called for a block (foul) also increases by 30% when the adrenaline button is not used during dunking (if a collision occurs). Similarly, the shot block rating of the opponent is increased by 30% if the adrenaline button is used while dunking. Similar exemplary changes in the parameters of the game can be seen for special dribbles, blocking, steals and shooting in the example above.

In accordance with the invention, the adrenaline feature is preferably implemented to make it not so advantageous offensively or defensively so that the user either never holds it down or always has it pressed all the way down. Instead, the game should be programmed to make it so the user uses this button with discretion and prudently in, for example, a close game, or when the situation is appropriate in the competition that is presented to the user at that time. An example of this would be a player that is dunking on an open breakaway. It makes sense for this user to press the adrenaline button all the way down in this case, because he has an opportunity to substantially boost his momentum and to make a spectacular play with little or no chance of being called for a charge or having his dunk blocked. Conversely, if he holds the button down all the time or uses it to dunk in traffic, it's very likely that he'll be called for a charge and/or have his dunk blocked.

It is also noted that, depending on the action, the particular animation would be different depending on if the button were held down or not, taking into account other factors that will affect the animation, such as which animations are available to which players, where the player is in relation to other players, etc.

It is important to note the adrenaline button is preferably not digital—it is analog, which means there are many more states than "Not Held" and "Held All the Way Down." So, for each of these actions, for any button position that is in the in between state, the parameters set forth will be scaled accordingly, thereby providing a full range of adrenaline functionality and corresponding affect on the game. For example, if no adrenaline causes a dunk boost of "1" to be added to the momentum meter, and full adrenaline causes a dunk boost of "10" to be added to the momentum meter, the other positions for the adrenaline button can be scaled accordingly (e.g., half way would result in a boost of "5", three-quarters would give a boost of "7.5", etc.). Any number of variations in the particular adrenaline result can be used depending on the desires of the game developers.

Below is an example of a dunk/lay-up records used in an exemplary game incorporating the adrenaline button of the instant invention. Within this record is a qualifier labeled "DQ_SHOWTIME(2)". This is the qualifier used to determine what rating a player will need to have to perform this particular dunk. In this embodiment, the range is from 0 to 5 with 5 being the best. The amount that the user holds the aggression button down will affect the players dunk rating. Thus, the greater the user holds down the button, the greater the aggression indicated, and therefore the greater the players rating will be which allows the player to do better or more spectacular dunks. A similar type of record is provided for all of the other types of moves that are available in the game.

Example Dunk Record

```
{
    DQ_BODY(ANIMBODY_hStandDunk1h180_A18),      // iBodyCode                              from AnimBody.h
    DQ_RATE(DQ_DRM*1.0f),              // fBodyRate               (float)
    false,                             // bBodyFlipped                                   true,false
    true,                              // bBodyCanFlip                                   true,false
    false,                             // bBouncesBall                                   true,false
    false,                             // bShootWithLeft          true,false
    false,                             // bSpinClockwise          true,false
    false,                             // bBodyEndsInRun          true,false
    false,                             // bExcludeHoopArc         true,false
    false,                             // bExcludeFaceArc         true,false
    DUNK_SLAM,                         // iDunkType
    DUNK_HANG,DUNK_SLAM,DUNK_FINGER,DUNK_LAYUP
    DQ_HEIGHT(0,0),                    // iArcHeight                                     (feet,inches) or zero
to leave original
    DQ_SCALE(0.0f),                    // iArcScale                                      0 for fixed time to 1
for fixed speed
    DQ_ANGLE(-135),                    // iMinPlyrToHoopAng       (degrees)
    DQ_ANGLE(-80),                     // iMaxPlyrToHoopAng       (degrees)
    DQ_RANGE(0,1),                     // iMinPlyrToHoopDst       (feet,inches)
    DQ_RANGE(4,0),                     // iMaxPlyrToHoopDst       (feet,inches)
    DQ_ANGLE(DQ_MIN_FACE_HOOP),        // iMinPlyrFaceAng         (degrees)
    DQ_ANGLE(DQ_MAX_FACE_HOOP),        // iMaxPlyrFaceAng         (degrees)
    DQ_SPEED(DQ_MIN_SD_SPEED,0),// iMinPlyrFaceSpd  (feet,inches) per second
    DQ_SPEED(DQ_MAX_SD_SPEED,0),// iMaxPlyrFaceSpd  (feet,inches) per second
    DQ_SKILL(4),                       // iMinPlyrSkill           (0..100)
    DQ_SIZE(9,0),                      // iMaxPlyrScale           (feet,inches)
    DQ_PLYR(PID_NOBODY),               // iPlyrCode                                      from PlayerIDs.h
    DQ_SHOWTIME(2)                     // iShowTimeRating                                0-5
},
```

In the example above, the "Showtime" qualifier is set at "2", which means the player must have a rating of at least "2" to perform this dunk. Thus, depending on the players maximum dunk rating, the player may need to use the adrenaline button to perform this dunk. For example, if the player has a dunk rating of "2", the player must, in this example, use full adrenaline to perform this dunk. On the other hand, a player with a dunk rating of "5", he can perform the dunk without any adrenaline being used (assuming that, for example, no adrenaline decreases the players dunk rating by 50%). Thus, in accordance with the preferred embodiment of the instant invention, the adrenaline button determines the types of plays or moves that each player can make, in combination with the players particular ratings for the various possible moves. This features makes the game much more realistic, because to perform at the player's highest level requires high adrenaline to be used. In this way, the user becomes intimately involved in each move the player makes during game play.

Figure 8A:
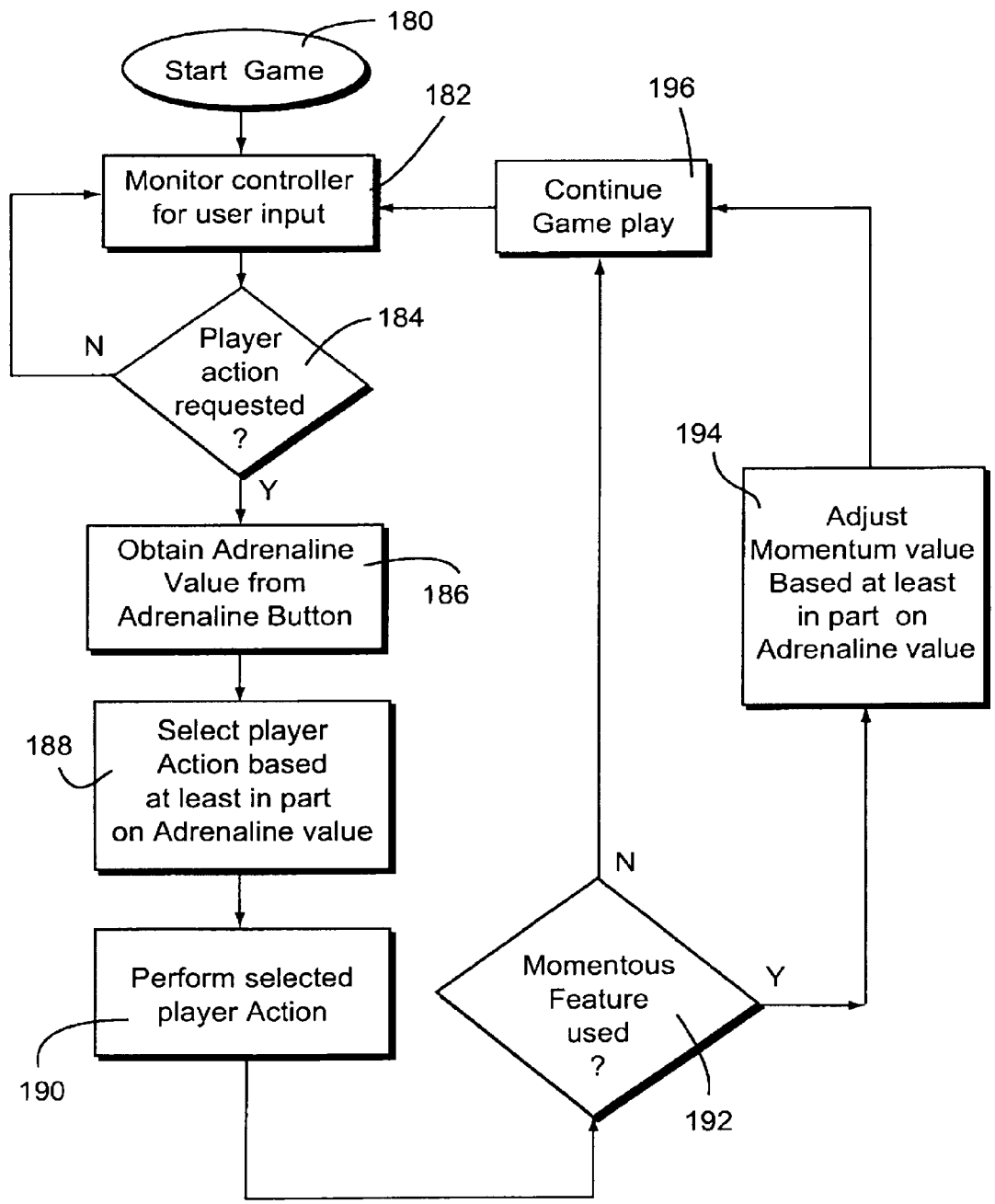
FIG. 8a is a flow chart showing the main steps performed when implementing one aspect of the preferred embodiment of the instant invention.

FIG. 8a shows a relatively high-level flow chart of the main steps that are performed by one aspect of the preferred embodiment of the instant invention. As seen in FIG. 8a, after the game is started (step 180), the system monitors the controller for user input (step 182) indicating a desire by the user to cause the player (e.g., basketball player) to respond in some manner within the game environment. If no player action is requested, the system continues to monitor for future user input. When it is detected that the user desires the player to take an action (step 184)(e.g., such as shooting the ball), the system reads the current adrenaline value (step 186) from the adrenaline button on the controller indicating the desired level of adrenaline requested by the user for that action. The particular action that the player takes is then selected from a plurality of possible actions based at least in part on the adrenaline value detected (step 188). The selected action is then performed by the player (step 190). If the momentum feature described above is used (step 192) in the particular implementation of the invention, then the momentum value for the team (or player) may be adjusted (step 194) based at least in part on the adrenaline value used and, possibly, on the outcome or success of the action that was performed. The game play is then continued (step 196) and the controller is again monitored for user input (step 182). The process then repeats as described above until the game is finished.

Figure 8B:
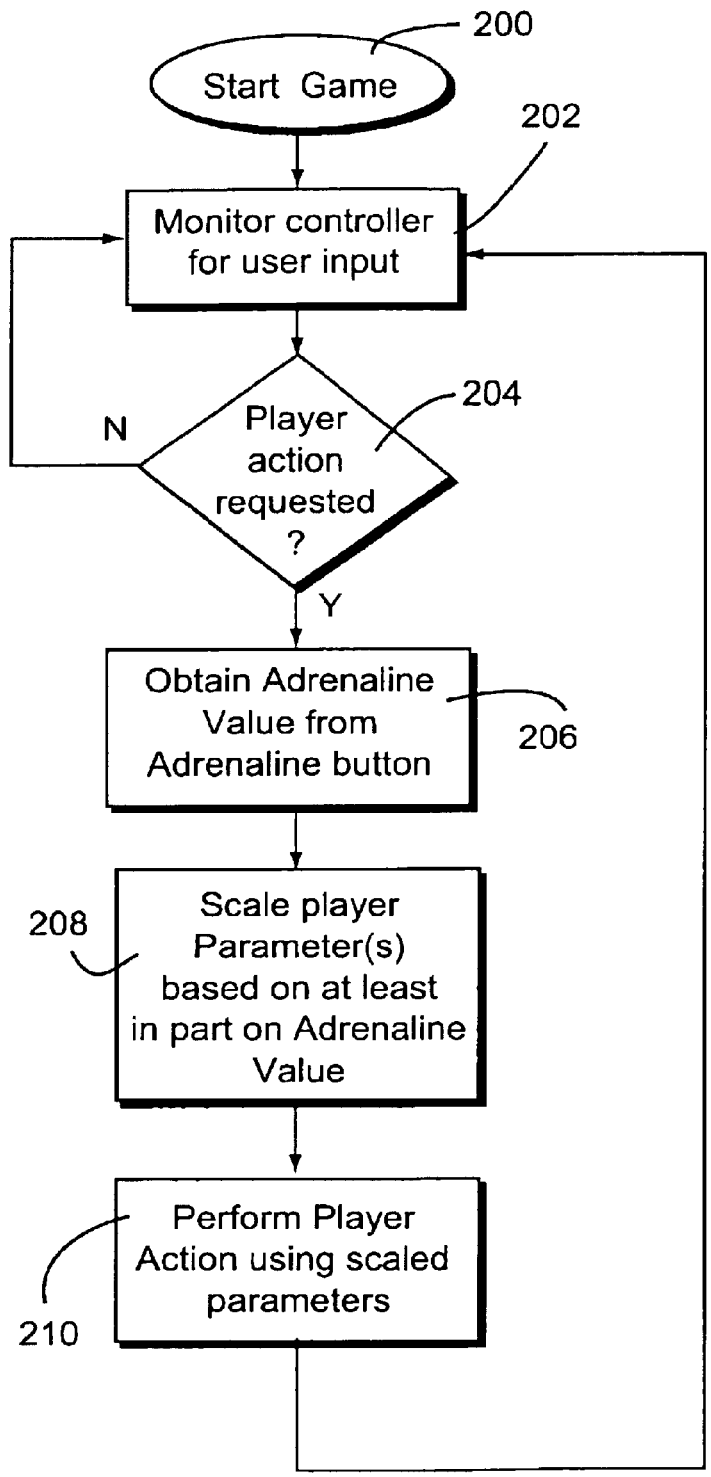
FIG. 8b is a flow chart showing the main steps performed when implementing another aspect of the preferred embodiment of the instant invention.

FIG. 8b shows another flow chart illustrating another aspect of the preferred embodiment of the instant invention. As shown is FIG. 8b, after the game is started (step 200), the controller is monitored for user input (step 202) indicating a desire by the user to have the player take action in the game. When a player action is requested (step 204), the system reads the current output of the adrenaline button (step 206) on the controller to determine the amount of adrenaline desired by the player for the current action. The adrenaline value is then used to modify or scale player parameters (step 208) used in connection with the game to correspond to the particular adrenaline indicated thereby. For example, as indicated above, the players shooting percentage may be increased or decreased accordingly. Any other desired parameters, such as indicated in the example above, may also be adjusted accordingly based on the adrenaline value detected at the time the action is requested. The player then performs the requested action (step 210) using the modified parameters and game play continues.

Figure 9A:
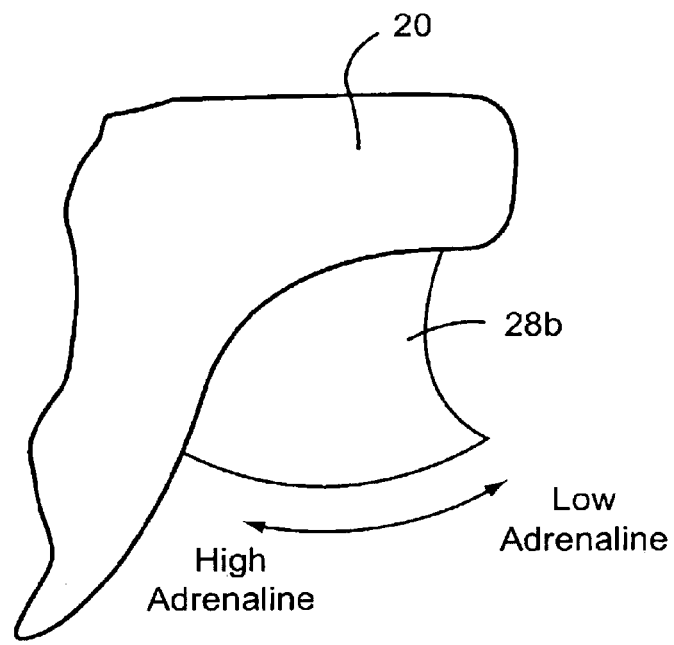
FIGS. 9a and 9b show a preferred embodiment of the adrenaline button in its low adrenaline and high adrenaline positions, respectively.
Figure 9B:
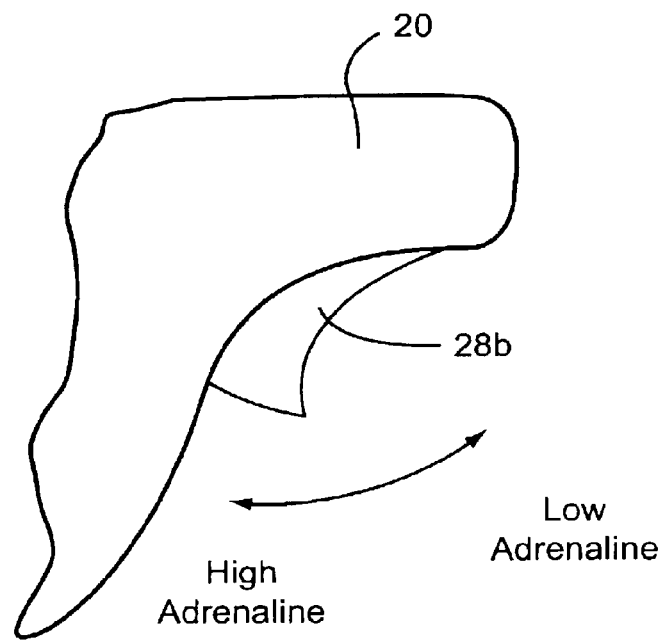

FIGS. 9a and 9b show an exemplary analog button 28b on the controller 20 used as the adrenaline button in accordance with a preferred embodiment of the instant invention. FIG. 9a shows the adrenaline button 28b in its low or no adrenaline position, wherein the user is not pressing the button to increased the adrenaline at that time. When the adrenaline button is in this low adrenaline position and an action is requested by the user, the player will act with low adrenaline and the players parameters will be scaled accordingly. FIG. 9b shows the adrenaline button 28b on controller 20 in its high adrenaline position indicating a desire by the user to have the player act aggressively and with an appropriate adjustment in the player's game parameters. Positions of the button 28b between the low and high levels, as shown in FIGS. 9a and 9b, result in a scaled adrenaline value being used based on the relative position of the button 28b, thereby giving a wide range of possible adrenaline values for use by the user during game play.

Example Illustrative Implementation

Figure 10A:
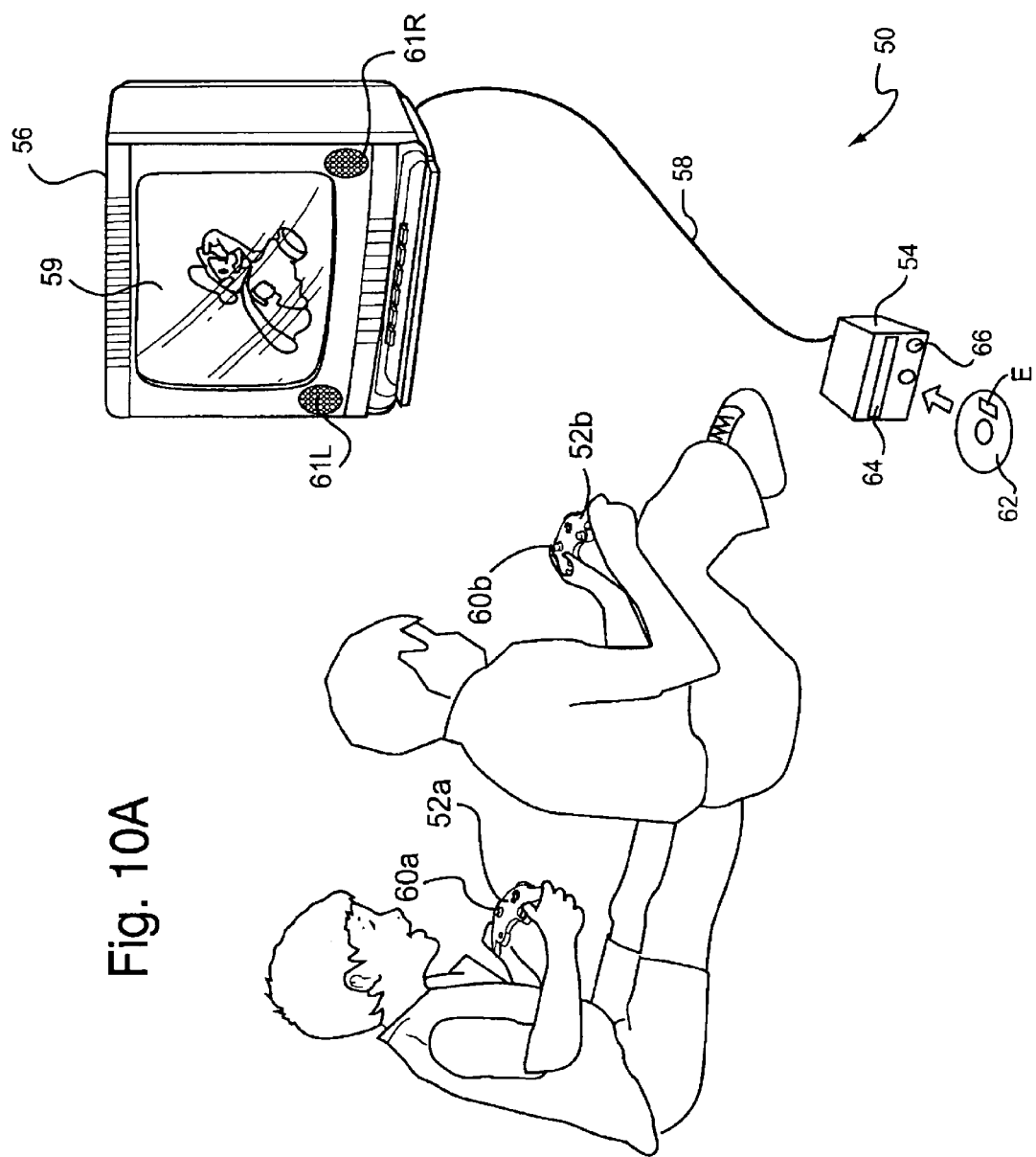
FIGS. 10A–10B illustrate an example system that may be used to create the displays of FIGS. 2–7.

FIG. 10A shows an example interactive 3D computer graphics system 50. System 50 can be used to play interactive 3D video games with interesting animation provided by a preferred embodiment of this invention. System 50 can also be used for a variety of other applications.

In this example, system 50 is capable of processing, interactively in real time, a digital representation or model of a three-dimensional world. System 50 can display some or the entire world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

As also shown in FIG. 10A, mass storage device 62 stores, among other things, a sports video game program E that enables an interactive game to be played using the system 50 and incorporates the adrenaline feature of the instant invention. The details of the preferred embodiment program E will be described shortly. The program E in the preferred embodiment makes use of various components of system 50 shown in FIG. 10B including:

a main processor (CPU) 110,
a main memory 112, and
a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices. Main processor 110 and graphics and audio processor 114 also perform functions to support and implement the preferred embodiment program E based on instructions and data E' relating to the program that is stored in DRAM main memory 112 and mass storage device 62.

Figure 10B:
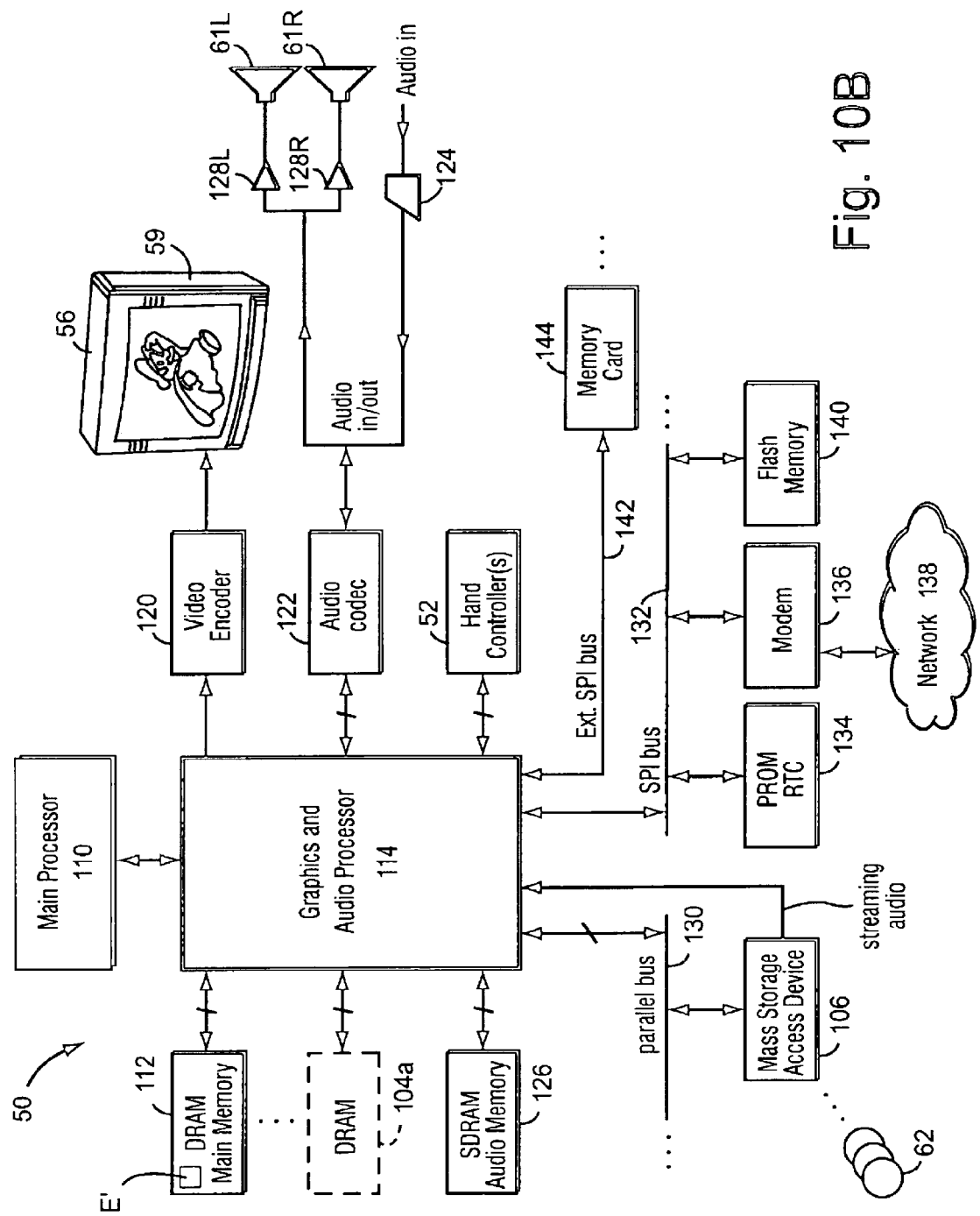

As further shown in FIG. 10B, example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142. For further details relating to system 50, see for example U.S. patent application Ser. No. 09/723,335 filed Nov. 28, 2000 entitled "EXTERNAL INTERFACES FOR A 3D GRAPHICS SYSTEM" incorporated by reference herein.

As can be seen from the above-description, the invention greatly improves sports video games by enabling the user to determine the level of intensity that a player will have when making a play or move. As a result, the user can use the adrenaline button strategically during the game as the circumstances may dictate. The player is given the ability to weigh the advantages of acting with high aggression with the disadvantages of acting with high aggression, and decide, based on his own reasoning, whether to use or not use the adrenaline button, as well as how much to use the button when the user decides to us it. In this way, sports games are made much more realistic and enjoyable for the users.

While the preferred forms and embodiment of the invention have been described herein, various modifications may be made without deviating from the scope of the instant invention, as one skilled in the art will understand from the description herein. The invention is not limited to the particular controller configuration shown in FIG. 1 and may be used with any suitable controller, game console and game software.

What is claimed is:

1. A method of controlling game play in a sports video game, wherein a user interactively controls a sports game character in a virtual sports game environment using a game controller, the method comprising:

defining initial character parameters for the sports game character and an opposing sports game character for use during game play, wherein the initial character parameters define play characteristics for the game character and the opposing game character;

detecting user input from at least one control element on the game controller requesting an animated action by the game character;

reading an adrenaline value from an analog control element on the controller indicating a level of aggression desired by the user for the animated action, wherein the analog control element is different from said at least one control element;

adjusting at least one of the initial character parameters for the game character based on the adrenaline value;

performing the animated action by the game character using the at least one adjusted character parameter, wherein the at least one adjusted character parameter is related to the animated action and influences the success or failure of the action depicted by the animated action; and adjusting at least one of the initial character parameters for the opposing character based on the adrenaline value and performing an animated action by the opposing character at the same time as the same character's animated action using the adjusted character parameter for the opposing character.

2. The method of claim 1, wherein the sports video game includes a momentum feature that can affect game play, said method further including adjusting a momentum value based at least in part on the adrenaline value that is used for an animated action.

3. The method of claim 1, wherein the sports video game is a basketball game.

4. The method of claim 1, further including adjusting a plurality of character parameters based on the adrenaline value.

5. The method of claim 3, wherein the at least one character parameter includes a shooting percentage for the character.

6. The method of claim 3, wherein the at least one character parameter includes a foul percentage for the character.

7. The method of claim 3, wherein the at least one character parameter includes a blocking percentage for the character.

8. The method of claim 1, wherein the control element is an analog button and adjusting at least one initial character parameter includes scaling the at least one parameter based on a relative position of the analog button at the time the animated action is requested by the player.

* * * * *